US006634519B2

United States Patent
Pelloux-Gervais et al.

(10) Patent No.: US 6,634,519 B2
(45) Date of Patent: Oct. 21, 2003

(54) METHOD FOR MANUFACTURING A TANK FOR A CRYOGENIC FLUID AND TANK THUS PRODUCED

(75) Inventors: Pierre Pelloux-Gervais, Seyssins (FR); Patrick Sanglan, Seyssins (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 37 days.

(21) Appl. No.: 09/863,363

(22) Filed: May 24, 2001

(65) Prior Publication Data

US 2002/0008111 A1 Jan. 24, 2002

(30) Foreign Application Priority Data

May 26, 2000 (FR) .............................. 00 06774

(51) Int. Cl.[7] .............................................. B65D 90/04
(52) U.S. Cl. .............................. 220/560.1; 220/560.12; 220/560.13; 220/560.04
(58) Field of Search ................... 220/560.13, 560.12, 220/560.14, 560.11, 560.1, 560.04

(56) References Cited

U.S. PATENT DOCUMENTS

| 3,231,125 A | * | 1/1966 | Sigona .................. 220/560.13 |
| 3,341,052 A | * | 9/1967 | Barthel .................... 220/560.1 |
| 3,355,050 A | * | 11/1967 | Ruzic .................... 220/560.13 |
| 3,525,452 A | * | 8/1970 | Hofmann ..................... 219/386 |
| 3,655,086 A | | 4/1972 | Trenner |
| 3,708,131 A | | 1/1973 | Barthel |
| 4,154,363 A | | 5/1979 | Barthel |
| 5,368,184 A | * | 11/1994 | Fay et al. ................... 220/562 |
| 5,419,139 A | | 5/1995 | Blum et al. |
| 5,857,640 A | | 1/1999 | Muzio, Jr. et al. |

FOREIGN PATENT DOCUMENTS

| DE | 34 12785 | 10/1985 |
| DE | 195 46619 | 6/1997 |

* cited by examiner

Primary Examiner—Joseph M. Moy
(74) Attorney, Agent, or Firm—Young & Thompson

(57) ABSTRACT

A tank for a cryogenic fluid, of the type comprising an inner vessel (2) intended to receive the cryogenic fluid and delimiting, with an outer vessel (8), a space (9) for the insertion of multilayer thermal insulation (7). The tank comprises multilayer thermal insulation (7) supporting the inner vessel (2) and an outer vessel (8) without a rigid connection to the inner vessel (2).

3 Claims, 2 Drawing Sheets

METHOD FOR MANUFACTURING A TANK FOR A CRYOGENIC FLUID AND TANK THUS PRODUCED

FIELD OF THE INVENTION

The present invention relates to the general technical field of manufacturing tanks for cryogenic fluids.

The subject of the invention is, more specifically, tanks for cryogenic fluid, insulated by the technique called super insulation.

BACKGROUND OF THE INVENTION

In the prior art, it is known to use cryogenic fluid tanks, in this instance for liquefied gases such as liquid hydrogen or liquid helium. Such a tank comprises an inner vessel equipped with pipes for filling and extracting the cryogenic fluid. This inner vessel is covered on the outside with high-performance thermal insulation in order to prevent the stored fluid evaporating too quickly. This vessel is thus insulated by the technique called super insulation, which aims to put in place multilayer thermal insulation consisting of the superposition of a heat reflector and of a thermally insulating interlayer. Conventionally, this multilayer thermal insulation is produced by means of winding at least one insulating strip consisting, in particular, of the superposition of a thin aluminium sheet forming a reflector and of an insulating paper or glass fibre sheet forming the interlayer. The insulating strip is wound using an insulating machine which winds the strip around the vessel, while the latter is set in rotation about its axis.

The tank also comprises an outer protective vessel intended to surround the multilayer thermal insulation. This outer vessel, which is generally made in two parts, is fastened to the inner vessel via connecting supports of the tie-rod or centring-feet type, passing through the multilayer thermal insulation. In practice, putting the supports in place on the vessels and fastening the vessels together are operations which are expensive and tricky to carry out properly.

Also, there appears to be a need to have available a technique for manufacturing a tank for a cryogenic fluid, adapted to be simple, cheap and capable of being carried out automatically, while making it possible to put in place high-performance thermal insulation which does not lead to an increase in the size of the tank for a given storage volume of the cryogenic fluid.

SUMMARY OF THE INVENTION

The object of the invention is therefore aimed at satisfying this need by providing a method for manufacturing a tank intended to contain a cryogenic fluid, the method being adapted to be simple, capable of being carried out automatically and cheap, while at the same time making it possible to obtain high-performance thermal insulation having a limited size in order to obtain a light, cheap and high-performance tank, especially for use in land or air vehicles.

The subject of the invention is therefore a method of manufacturing a tank intended to contain a cryogenic fluid, the method consisting in fitting an inner vessel intended to receive the cryogenic fluid, inside an outer protective vessel which delimits, with the inner vessel, a space for the insertion of multilayer thermal insulation.

According to the invention, the method consists in:
fitting the multilayer thermal insulation around the inner vessel, such that the said thermal insulation supports the inner vessel, and
fitting the outer vessel around the multilayer thermal insulation, without a rigid connection to the inner vessel.

The subject of the invention is also a tank for cryogenic fluid, of the type comprising an inner vessel intended to receive the cryogenic fluid and which delimits, with an outer vessel, a space for the insertion of multilayer thermal insulation. According to the invention, the reservoir comprises multilayer thermal insulation supporting, on its own, via insulating interlayers, the inner vessel and an outer vessel without a rigid connection to the inner vessel.

Another subject of the invention relates to an insulating machine for implementing the method of manufacturing a tank for cryogenic fluid, the machine comprising means to set in rotation, about its axis, an inner vessel for cryogenic fluid and means to wind around the inner vessel, an insulating strip forming several superimposed insulating layers, each one consisting of a thermally insulating interlayer and of a heat reflector.

According to the invention, the machine comprises means to wind, at least locally about the inner vessel, at least one series of thermal insulation strips inserted in a superimposed manner between the heat reflectors in order to support the inner vessel and to separate the heat reflectors.

BRIEF DESCRIPTION OF THE DRAWINGS

Various other characteristics will emerge from the description below made with reference to the appended drawings which show, by way of non-limiting examples, forms of embodiment and of implementation of the subject of the invention.

BRIEF DESCRIPTION OF THE INVENTION

Figure 1:
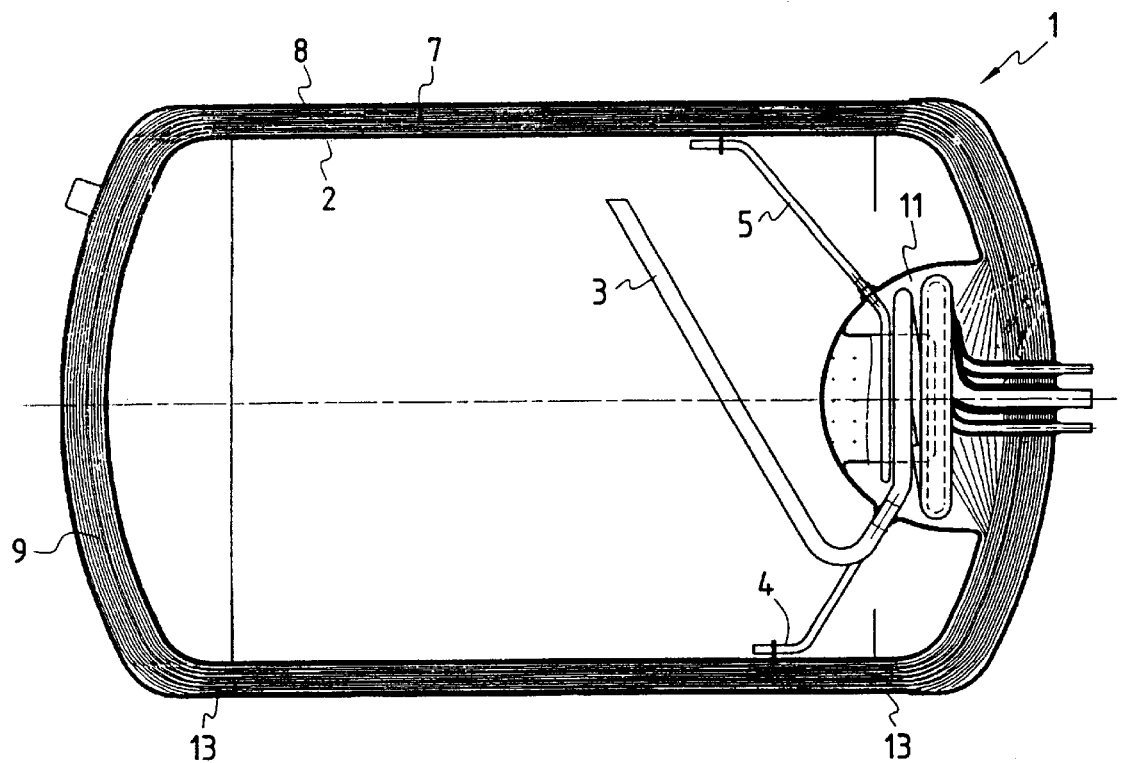
FIGS. 1 and 2 illustrate two variants of the embodiment of a tank according to the invention.

FIG. 1 illustrates an exemplary embodiment of a cryogenic fluid tank 1 in this instance for liquefied gases such as liquid hydrogen or liquid helium. Such a tank 1 may provide fixed storage or be installed on a vehicle.

The tank 1 comprises an inner vessel 2 with inherent stability, made of any suitable material, such as, for example, aluminium, stainless steel or plastic. This inner vessel 2 is conventionally fitted with pipes for filling with fluid 3 and for liquid 4 and gas 5 extraction. The inner vessel 2 is, conventionally, insulated by high-performance thermal insulation 7, produced according to the technique called super insulation. The thermal insulation 7 is produced conventionally via a machine which will be described more specifically in FIG. 4. This thermal insulation 7 is obtained via an insulting strip forming a succession of superimposed insulating layers. The insulating strip may consist of the superposition of a heat reflector, such as a thin sheet of aluminium, and of a thermally insulating interlayer, such as an insulating paper or glass fibre sheet.

Figure 2:
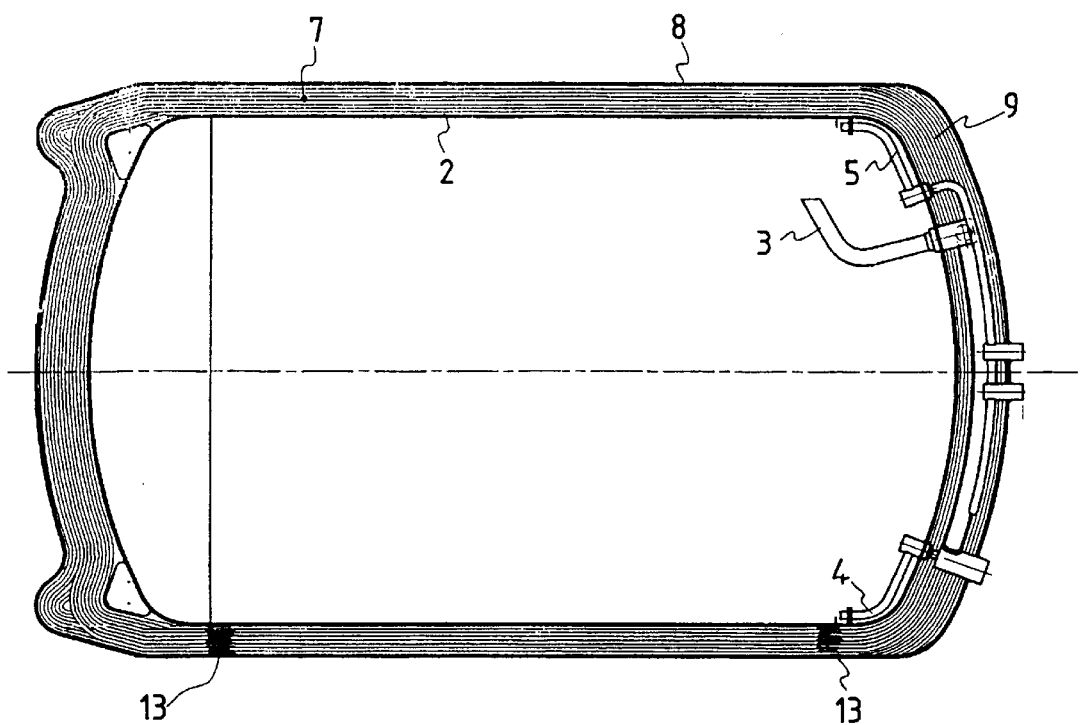

The tank 1 also comprises an outer vessel or protective envelope 8 with inherent stability, fitted at a distance from the inner vessel 2 in order to delimit with the latter a space 9 in which the thermal insulation 7 is placed. For example, the outer vessel 8 is produced in two parts fastened together by any suitable means. Of course, the filling 3 and extraction 4, 5 pipes are adapted to pass through the thermal insulation 7 and the outer vessel 8, in order to be accessible from outside the tank 1. It should be noted that, in the example illustrated in FIG. 1, the filling 3 and extraction 4, 5 pipes each comprise a lyre-shaped part completely integrated into a clearance or hollow volume 11 made in the inner vessel 2. These lyre-shaped parts are extended by straight parts passing through the inter-vessel space 9 making it easier to put in place the thermal insulation 7. Of course, these lyre-shaped parts of the pipes 3, 4, 5 may, conventionally, be arranged within the thickness of the inter-vessel space 9, as is shown more specifically in FIG. 2.

According to the invention, the thermal insulation 7 is fitted around the inner vessel 2 such that this thermal insulation 7 ultimately supports the inner vessel 2. The thermal insulation 7 is thus adapted to support the total mass of the inner vessel 2. Given the low density of cryogenic liquids, such as liquid hydrogen and liquid helium, it is possible to completely dispense with the structural components for rigid connection between the outer vessel 8 and the inner vessel 2. In other words, the outer vessel 8 is fastened around the thermal insulation 7 without any rigid connection to the inner vessel 2. The inner vessel 2 in the envelope vessel 8 is therefore supported only by the thermal insulation 7. In this respect, the filling/extraction pipes 3–5 are supple or flexible, so that they do not set up a rigid connection between the inner vessel 2 and the outer vessel 8. The supple nature of the pipes 3–5 may be obtained by shaping them like a lyre and/or by making them from a supple or flexible material. Moreover, to the extent that the thermal insulation 7 completely surrounds the inner vessel 2 and is inserted between the inner vessel 2 and the outer vessel 8, the thermal insulation 7 makes it possible to hold the inner vessel 2 in position with respect to the outer vessel 8.

Of course, the thermal insulation 7 is engineered to support the inner vessel 2, the mass of which depends, in particular, on the volume of the vessel and of the cryogenic liquid contained in this vessel. The thermal insulation 7 is engineered such that this thermal insulation keeps its thermal insulation properties, whatever the compression forces to which it is subject. This is because the thermal insulation 7 is subject to stresses due either to outer stressing, such as vibrations appearing in respect of a tank fitted on a vehicle, or to deformation of the inner vessel 2 because of the variations in temperature and in pressure. Thus, the multilayer thermal insulation 7 comprises interlayers made from materials which are suitable to provide thermal insulation between the heat reflectors while taking into account the applied stresses. According to one embodiment characteristic, it is conceivable to fit the outer vessel 8 so as to prestress the multilayer thermal insulation 7, in order to compensate for the deformation gaps due to the compression forces which are likely to occur during use, especially on board vehicles.

According to another embodiment characteristic, it is advantageous to insert, at least locally, in a superimposed manner, between the heat reflectors, interlayer thermal insulation strips 13 providing the main support for the inner vessel and the separation between the heat reflectors. As is shown more clearly in FIGS. 1 and 2, the contact pressure of the inner vessel 2 is thus localized on these thermal insulation strips 13, such that the intrinsic properties of the multilayer thermal insulation can be preserved. This is because the presence of these thermal insulation strips 13 makes it possible to prevent the compression or the flattening of the interlayers, which would have the effect of degrading the thermal insulation. It should be noted that these thermal insulation strips 13 or interlayers can be localized or distributed over the surface of the inner vessel 2 and consist, for example, of a sheet of insulating paper or glass fibre.

Figure 3:
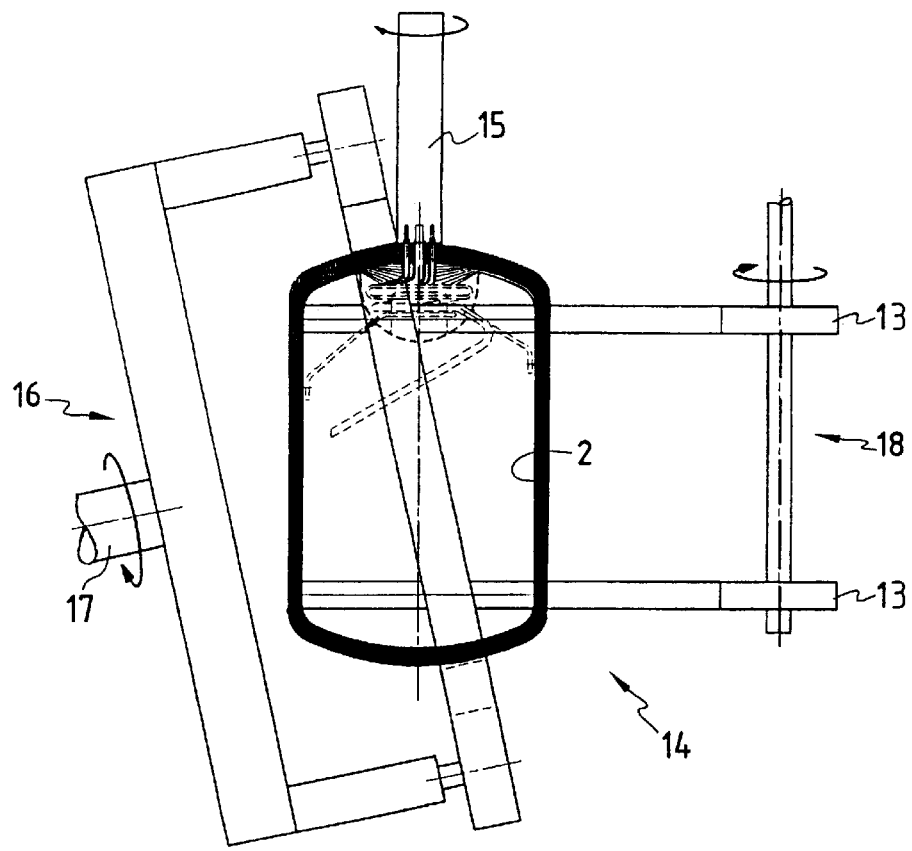
FIG. 3 is a diagram showing a taping machine which makes it possible to implement the method according to the invention.

FIG. 3 shows an exemplary embodiment of an insulating machine 14, known per se, which is modified to enable the thermal insulation strips 13 to be put in place. Conventionally, this machine comprises a shaft 15 set in rotation and to the end of which the inner vessel 2 is fitted. Moreover, this machine 14 comprises a taping unit 16 for an insulating strip, whose winding around the vessel makes it possible to obtain multilayer thermal insulation. The taping unit 16 is thus equipped with reels of strips of insulation and of aluminium. Such a taping unit 16 is fitted so as to rotate in the customary manner about an axis 17 inclined with respect to the axis of the shaft 15. According to the invention, this insulating machine 14 comprises means 18 to wind, at least locally around the vessel 2, a series of thermal insulation strips 13, for example made of paper or of glass fibre, intended to be inserted in a superimposed manner between the insulation strips and the reflectors of the unit 16.

As emerges from the preceding description, the cryogenic tank 1 can be manufactured simply and quickly since there are no operations of fastening the inner vessel 2 and the outer vessel 8 together. The use of the thermal insulation 7 as support for the inner vessel 2 allows automation of the manufacturing operations of such a tank. In addition, high-performance thermal insulation can be obtained, the size of which is hardly increased although this thermal insulation takes on the functions of supporting and holding the inner vessel 2. As the support for the inner vessel 2 is via the thermal insulation 7, the outer vessel 8 is fitted, in any suitable manner, to surround the thermal insulation, such as, for example, in two parts fastened together.

Figure 4:
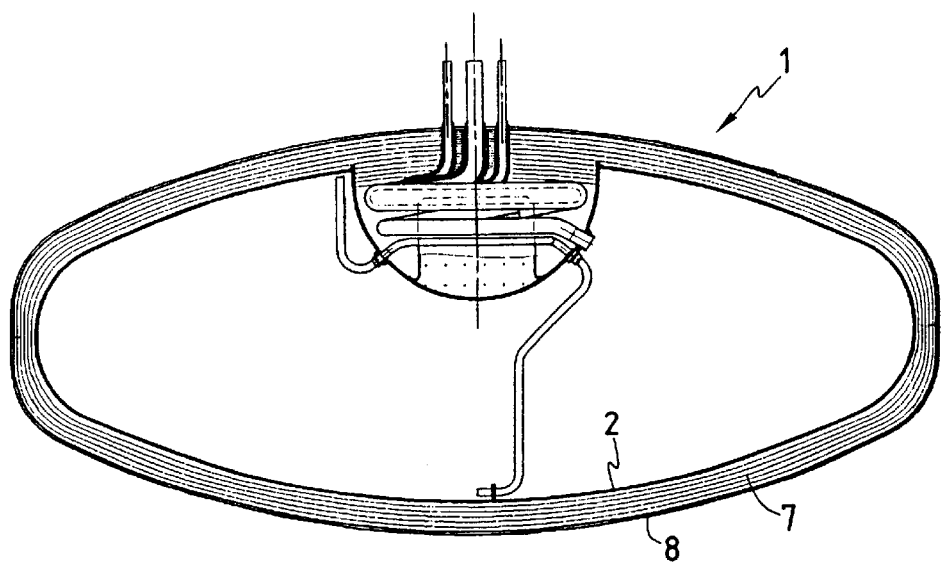
FIG. 4 is another exemplary embodiment of a tank according to the invention.

The object of the invention finds a particularly advantageous application in producing a tank for a cryogenic fluid intended to be loaded onto a vehicle. This is because, according to the invention, it is possible to produce, simply and cheaply, tanks with very varied shapes having a small size and high-performance thermal insulation. FIG. 4 illustrates, by way of example, another exemplary embodiment of a tank 1 according to the invention, the cross section of which is different from those of the tanks illustrated in FIGS. 1 and 2.

The invention is not limited to the examples described and shown, since various modifications can be made thereto without departing from its scope.

What is claimed is:

1. A tank for carrying low temperature cryogenic fluids, comprising:
    an inner vessel defining an inner volume for receiving a cryogenic fluid;
    fluid conduit means opening into the inner volume for admitting in fluid and withdrawing fluid from the inner volume;
    a multilayer thermal insulation disposed around the inner vessel and consisting of wrapped superpositions of composite bands, each consisting of an insulating material and of a thermal reflector superposed thereto; and
    an outer vessel mounted around the multilayer thermal insulation, the fluid conduit means extending in a flexible manner through the multilayer insulation and the outer vessel, whereby said fluid conduit means are free from rigid connection with both the inner and outer vessels and no rigid link exists between the inner and outer vessels.

2. A tank for carrying low temperature cryogenic fluids, comprising:

an inner vessel defining an inner volume for receiving a cryogenic fluid;

fluid conduit means opening into the inner volume for admitting in fluid and withdrawing fluid from the inner volume;

a multilayer thermal insulation disposed around the inner vessel and consisting of wrapped superpositions of composite bands, each consisting of an insulating material and of a thermal reflector superposed thereto;

an outer vessel mounted around the multilayer thermal insulation so as to pre-stress said multilayer thermal insulation between the inner and outer vessels, with no rigid link existing between said inner and outer vessels; and wherein at least part of said fluid conduit means extending within said inner vessel is flexible.

3. A tank for carrying low temperature cryogenic fluids, comprising:

an inner vessel defining an inner volume for receiving a cryogenic fluid;

fluid conduit means opening into the inner volume for admitting in fluid and withdrawing fluid from the inner volume;

a multilayer thermal insulation disposed around the inner vessel and consisting of wrapped superpositions of composite bands, each consisting of an insulating material and of a thermal reflector superposed thereto;

an outer vessel mounted around the multilayer thermal insulation so as to pre-stress said multilayer thermal insulation between the inner and outer vessels, with no rigid link existing between said inner and outer vessels; and wherein said fluid conduit means are flexible and partly accommodated in a recessed part of the inner vessel substantially devoid of the multilayer thermal insulation.

* * * * *